July 3, 1956     E. G. NEWSOM     2,753,524
WAVE ANALYZER
Filed Jan. 22, 1953
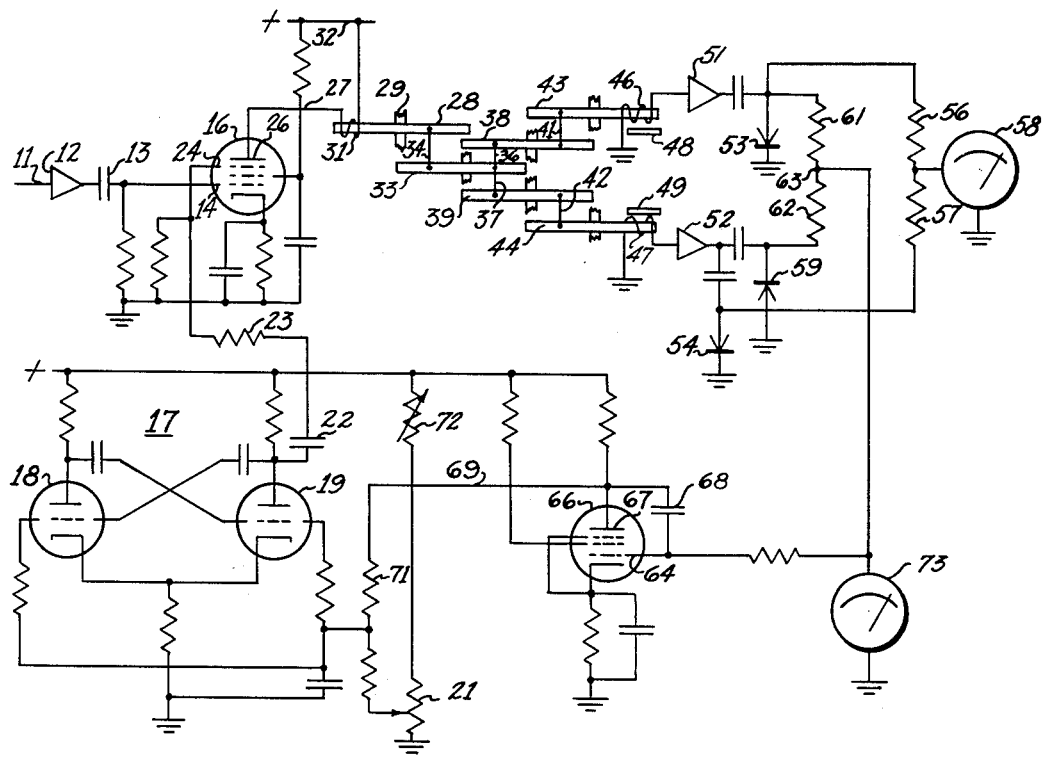
INVENTOR.
EARL G. NEWSOM
BY
ATTORNEY.

2,753,524

WAVE ANALYZER

Earl G. Newsom, Thornwood, N. Y., assignor to General Precision Laboratory Incorporated, a corporation of New York Application January 22, 1953, Serial No. 332,679

7 Claims. (Cl. 324—77)

This invention relates to wave analyzers and more specifically to electronic heterodyne wave analyzers which automatically track the frequency of the signal component to be analyzed.

Heterodyne wave analyzers are widely used for determining the magnitude of frequency components of a complex electrical wave. In such instances an input signal of selected frequency is mixed with the output of an adjustable heterodyne oscillator and thereby modulated. A selected sideband component is then filtered, amplified and its amplitude is measured, the measurement representing the amplitude of the input signal of selected frequency. A difficulty is encountered in the use of such an instrument when the filter is highly selective, as it usually is, if the input signal to be measured is not absolutely steady in frequency. It then becomes necessary to readjust the adjustable heterodyne oscillator continuously so as to track the changes in input frequency manually for a long enough time to secure a reading. This is often difficult and for some input signals is completely impossible.

The present invention employs automatic tracking to eliminate this difficulty. The automatic tracking can be made as rapid as desired, although in accordance with basic filter design the tracking speed is limited by the filter bandwith. The present invention also employs a special type of mechanical filter, resulting in improved simplicity.

Briefly, in operation an input signal wave form containing a component to be measured in amplitude is applied to a modulator. A heterodyning signal frequency is also applied to the modulator from an adjustable multivibrator. The heterodyned output product or sideband component which has a frequency equal to that of the input signal subtracted from the multivibrator signal frequency is selected by a series of mechanical filter stages in tandem, followed by two series of stages one tuned slightly above and the other below the first series. These filters discriminate between positive and negative frequency aberrations. Their output sum is employed to operate an amplitude indicator meter, while their difference is employed to cause the multivibrator oscillator to track the signal. That is, the difference frequency signal is integrated and made to control the oscillator bias so as to tend to reduce the difference frequency of the discriminator filter output to zero. In so doing the oscillator is maintained at such frequency above that of the input signal that the frequency difference exactly equals the resonant frequency of the input filter. Thus, as the input signal frequency changes, it is followed or tracked by the analyzer.

A further understanding of the invention may be had from the detailed description together with the single figure of the drawing constituting a schematic diagram of an automatically tracking wave analyzer embodying the invention.

Referring now to the figure, an alternating current signal is applied through conductor 11 to a stable calibrated amplifier 12. This input signal has a component the frequency of which is approximately known and the amplitude of which it is desired to measure. The signal component may have a frequency that varies over such a range and/or in such a random manner as to make it difficult or impossible to measure with conventional wave analyzers. Such a frequency may, however, be measured with the analyzer of the invention because it tracks automatically within a reasonably wide range of aberrations.

The frequency ranges which may be measured are limited by practicable limits of size of the mechanical filters and by their resonance characteristics. These limits are indefinite, but the range of frequencies which may be covered extends at least from within the audio range to higher frequencies measured in scores or hundreds of kilocycles per second. As an example, the mechanical filter of the figure is centered at 18 kc. By use of an oscillator adjustable between 18.02 kc. and 35.98 kc., input frequencies between 20 cycles per second and 17.98 kc. can be measured. These frequencies are predicated on the employment of a mechanical filter having an effective pass band of ten cycles per second.

The output of amplifier 12 is applied through a condenser 13 to the control grid 14 of a pentode modulator 16. The other input to the modulator is applied from a free-running multivibrator 17 comprising triodes 18 and 19 through a condenser 22 and resistor 23 to the third grid 24 thereof. The multivibrator 17 constitutes a positive grid oscillator having the frequency range of 18.02–35.98 kc., and is made variable over that range by manual adjustment of the grid bias voltage divider 21. The divider 21 is calibrated in frequency units between 20 C. P. S. and 17.98 kc., and by slowly adjusting it throughout its range in the vicinity of the frequency to be measured, the input signal frequency is heterodyned thereby to the filter frequency and the analyzer thereupon locks itself to the input signal and thereafter tracks with it without further manual change of the voltage divider 21. If the input signal applied at 11 should vary in frequency the analyzer will track it automatically within the design range and rate.

The modulator 16 output is taken from its anode 26 and consists of variations in the anode current. These anode current variations will in general include both input frequencies, their sum and difference and frequently many other frequencies generated as square wave harmonics by the oscillator 17 and including any other frequencies present in the input signal at 11, together with all intermodulation product frequencies. Only one of these frequencies is utilized, the difference frequency of the two principal inputs. Since in this example the oscillator fundamental frequency range is above the input signal frequency range, the difference frequency is computed in all cases by subtracting the input frequency from the oscillator frequency. However, this invention is not restricted to this method of operation, but permits it as more convenient in many cases.

As an aid in understanding the operation of the invention, let it be assumed that it is desired to measure the third harmonic output magnitude of an audio amplifier, the amplifier input being secured from a disc record inscribed with a pure 333 C. P. S. tone record played on a record player of high quality. Such a record player, although of high quality, usually has sufficient speed instability to vary the frequency enough to make it impossible to measure with any existing analyzer. At the third harmonic, of course, this variation in frequency is three times that of the fundamental. If, for example, an electrical filter having a pass band of ± 5 C. P. S. is employed in a non-tracking analyzer, an oscillation that varies the frequency between 993 and 1007 C. P. S. during each turntable revolution will make measurement impossible.

Referring to the figure the input signal having the normal frequency of 1000 C. P. S. is applied to the control grid 14 of tube 16. The voltage divider 21 is moved to its 1000 C. P. S. scale position so that an oscillator output having a frequency of 19,000 C. P. S. is generated. The output of the modulator 16 applied to conductor 27 therefore includes a current having a frequency of 18 kc. among others.

The first stage of the mechanical filter comprises a thin-walled nickel tube 28 secured by clamping its center to a fixed support 29. The tube is surrounded by a solenoid 31 coaxial with the tube and connected at one end to a source of positive potential represented by conductor 32 and at the other end to conductor 27. The positive source thus provides plate potential for tube 16 and also provides a flow of direct current which creates a magnetic field coaxial with the rod 28. When the alternating current output of the modulator 16 also flows in coil 31 all conditions necessary for magnetostrictive excitation of rod 28 exist, and if the exciting frequency is within the resonant frequency band of the rod it will be set into longitudinal mechanical vibration. A tube of this type may have a figure of merit or Q of 1250 and therefore act as a relatively broadband resonator. Its physical dimensions in this example are such as to have a midband resonant frequency of 18,000 C. P. S.

In place of the thin-walled nickel tube a ferrite rod may be employed or any other type of magnetostrictive material.

The magnetostrictive mechanical filter stage comprising rod 28 is followed by a second and much narrower band stage comprising rod 33, also clamped at its center. This rod is sharply tuned to 18 kc. and may for example be made of an alloy of aluminum, copper, manganese and magnesium commonly known by the trade name of Duralumin, which has a Q of 8000. The rod has a length of 4.980 inches and a diameter of ¼ inch. The Duralumin rod is given a thin coat of nickel or zinc plating at selected spots to facilitate soldering.

The coupling between rods 28 and 33 consists of a thin wire 34 about one inch long and .04 inch in diameter, preferably made of beryllium copper. This wire is soldered or otherwise secured at one end to the rod 28 about one inch from the clamp 29, and the other end of the wire is soldered to the rod 33 about one inch from its clamp. The degree of coupling is dependent upon the wire length, diameter and stiffness, increasing with shortness, thickness and stiffness. The degree of coupling is also dependent upon the locations of the fastening points and increases as each point is moved toward the end of its rod.

The utility of this type of coupling lies in its efficiency combined with ease of application and of adjustment. When employing highly resonant mechanical stages the degree of coupling provided by such a wire is ample. Such coupling also affords a manufacturing advantage in permitting corrections in the resonant frequency of a rod by filing its end or loading with solder without disturbing the coupling wire.

The rod 33 comprises a single sharply tuned mechanical filter stage having an effective bandwidth of 10 C. P. S., and provides sufficient rejection of unwanted frequencies but if greater rejection is desired it can be followed by one or more similar stages similarly coupled and operating in tandem.

The stage comprising rod 33 is followed by two stages stagger tuned and both excited from rod 33 by coupling wires 36 and 37 similar to the described coupling wire 34. The two stages comprise rods 38 and 39 which are similar to rod 33, both rods having a diameter of ¼ inch and being made of Duralumin. The stage comprising rod 38 has a resonant frequency above that of rod 33 while rod 39 has a resonant frequency below by the same amount. Specifically, the 10 C. P. S. bands of these rods overlap so that the center frequency of rod 38 is tuned 4 C. P. S. above 18 kc. and that of rod 39 is tuned 4 C. P. S. below 18 kc. Since resonant frequency is inversely proportional to length, rod 38 is shorter than rod 33 by 0.0011 inch and rod 39 is longer than rod 33 by 0.0011 inch.

These two stages consisting of rods 38 and 39 taken together comprise a filter frequency discriminator which detects small aberrations of the resonating frequency of rod 33 above or below the central frequency of its resonant band. When rod 33 resonates one to five cycles per second or more above its central frequency of 18 kc. it excites rod 38 much more strongly than it excites rod 39, and at lower than 18 kc. frequency the reverse is true. At mid frequency rods 38 and 39 are excited equally.

Rods 38 and 39 are coupled through wires 41 and 42 of the type before described to two more widely tuned rods 43 and 44, similar to rod 28 in material but similar respectively to rods 38 and 39 in central frequency. These rods 43 and 44 comprise take-off stages and for that purpose each is provided with a coaxial take-off solenoid 46 and 47, and a coaxial magnetic field produced in any manner and schematically indicated by the permanent rod magnets 48 and 49. The rods 43 and 44 thus employ the magnetostrictive principle to develop in coils 46 and 47 voltages proportional to the degree of vibration of the respective rod. These voltages are amplified in amplifiers 51 and 52.

The output voltage magnitudes of amplifiers 51 and 52 are added by means of rectifiers 53 and 54 and equal resistors 56 and 57, and a voltage to ground representing the sum is applied to an indicator represented by meter 58. The indication of this meter is thus proportional to the amplitude or magnitude of the alternating energy passed through the mechanical filter, and indicates the desired useful output information of the analyzer.

Automatic tracking is effected by subtracting the outputs of amplifiers 51 and 52 by means of reversed rectifiers 53 and 59, and equal resistors 61 and 62, the direct voltage to ground at midterminal 63 representing the difference output. This voltage is applied to the control grid 64 of a pentode 66 having its grid 64 and anode 67 connected through condenser 68 and therefore comprising a Miller integrator, so that the direct current output level at the anode conductor 69 represents the integral of the divergence in frequency of the input to the mechanical filter from the central resonant frequency thereof. This voltage is applied through resistor 71 to the grid bias network of the oscillator 17. Polarities are so arranged that the application of this potential tends to change the frequency of oscillation in such direction as to make the input signal frequency to the filter approach its central resonant frequency. These changes in the oscillator 17 therefore track changes in the input signal applied to conductor 11.

It is desirable to provide a zero-adjusting resistor 72 in series with voltage divider 21, and a zero indicating meter 73. To adjust the zero a constant known frequency is applied at 11 and the voltage divider 21 is set at that frequency. The resistor 72 is then varied until the indicator 73 reads zero voltage, when the input to the mechanical filter will be the same in frequency as the central resonant frequency.

What is claimed is:

1. An automatically tracking wave analyzer comprising, a heterodyne oscillator, an electrical signal source containing a signal frequency component whose amplitude is to be measured, modulator means connected to said heterodyne oscillator and said signal source for producing therefrom a modulated signal, mechanical filter means resonant at a selected frequency, means for causing the modulated signal produced by said modulator means to excite said mechanical filter means, a pair of mechanical filter means tuned to resonance above and below said selected frequency respectively, said pair of mechanical filter means being coupled to said first mentioned mechanical filter means and excited thereby thus discriminating between senses of departure of oscillation from said selected frequency, a pair of transducers respectively actuated by said pair of mechanical filter means, means for indicating the sum of the outputs of said pair of transducers, an integrator, means for actuating said integrator by the differential output of said pair of transducers, and means for controlling the frequency of said heterodyne oscillator by the output of said integrator.

2. An automatically tracking wave analyzer comprising, a heterodyne oscillator, an electrical signal source containing a signal frequency component whose amplitude is to be measured, modulator means connected to said heterodyne oscillator and said signal source producing therefrom a modulated signal, a solid having a selected shape and capable of vibrating at a specific frequency, electromechanical transducer means for producing vibration of said solid, said transducer means being excited by said modulated signal, a pair of solids having selected shapes and capable of vibrating respectively at frequencies above and below said specific frequency, filaments connected from a point other than the null vibration point of said first mentioned solid to a point other than the null vibration point of each of said pair of solids whereby the mechanical vibration of said solid is coupled to said pair of solids, a pair of transducers respectively excited by said pair of solids, means for indicating the sum of the outputs of said pair of transducers, an integrator, means for actuating said integrator by the differential output of said pair of transducers and means for controlling the frequency of said heterodyne oscillator by the output of said integrator.

3. An automatically tracking wave analyzer comprising, a heterodyne oscillator, an electrical signal source containing a signal frequency whose amplitude is to be measured, modulator means connected to said heterodyne oscillator and said signal source producing therefrom a modulated signal, a rod capable of vibrating at a specific frequency, an electromechanical transducer producing vibration of said rod, said transducer being excited by said modulated signal, a pair of rods capable of vibrating at frequencies above and below said specific frequency, a filament connected from a point other than the null vibration point of said first mentioned rod to a point other than the null vibration point of each of said pair of rods whereby the mechanical vibration of said first mentioned rod is coupled to said pair of rods, a pair of mechanical electrical transducers respectively excited by said pair of rods, means for indicating the sum of the outputs of said pair of transducers, an integrator, means for actuating said integrator by the differential output of said pair of transducers, and means for controlling the frequency of said heterodyne oscillator by the output of said integrator.

4. An automatically tracking wave analyzer comprising, an oscillator, a source of signals which include a signal frequency whose amplitude is to be measured, a modulator having the output of said oscillator and the signals of said source impressed thereon, and producing therefrom modulated signals, a magnetostrictive rod tuned to a selected frequency, means operated by the output of said modulator for vibrating said magnetostrictive rod at its selected frequency, a pair of magnetostrictive rods one of which is tuned to a frequency above and the other of which is tuned to a frequency below said selected frequency, means coupling each of said pair of magnetostrictive rods to said first mentioned magnetostrictive rod, a pair of transducers respectively excited by the vibrations of said pair of magnetostrictive rods, means for producing a sum signal the amplitude of which is proportional to the sum of said transducer outputs, means for indicating the amplitude of said sum signal means for producing a signal the amplitude of which is proportional to the difference of said transducer outputs, and means for controlling the frequency of said oscillator in accordance with the amplitude of said last mentioned signal.

5. An automatically tracking wave analyzer comprising, an oscillator, a source of signals including a signal frequency whose amplitude is to be measured, a modulator having the output of said oscillator and the signals of said source impressed thereon and producing therefrom a modulated signal, a magnetostrictive rod tuned to a selected frequency, means for impressing the output of said modulator on said magnetostrictive rod and for producing vibration thereof at said selected frequency, a pair of magnetostrictive rods one of which is tuned to a frequency above said selected frequency and the other of which is tuned to a frequency below said selected frequency, filamentary connections between said first mentioned magnetostrictive rod and each of said pair of magnetostrictive rods, a pair of transducers respectively excited by the vibration of said pair of magnetostrictive rods, means for producing a sum signal the amplitude of which is proportional to the sum of said transducer outputs, means for indicating the amplitude of said sum signal means for producing a signal representative of the difference output of said pair of transducers, an integrator, means for impressing said difference signal on said integrator, and means for controlling the frequency of said oscillator by the output of said integrator.

6. An automatically tracking wave analyzer comprising, an oscillator, a modulator having impressed thereon the output of said oscillator and an input signal, the amplitude of a frequency component of which is to be measured, said modulator producing therefrom a modulated output signal, a magnetostrictive rod tuned to a selected center frequency, means for impressing said modulated output signal on said magnetostrictive rod to cause vibration thereof over a band of frequencies centered about said selected center frequency, a pair of magnetostrictive rods one of which is tuned to a center frequency above said selected center frequency and the other of which is tuned to a center frequency below said selected center frequency, said pair of magnetostrictive rods each vibrating over an overlapping band of frequencies, filamentary couplings between said first mentioned magnetostrictive rod and each of said pair of magnetostrictive rods, a pair of transducers respectively coupled to each of said pair of magnetostrictive rods for producing signals whose amplitudes are proportional to the amplitudes of vibration of said pair of magnetostrictive rods, means for subtracting said last mentioned signals to produce a difference signal, an integrator having said difference signal impressed thereon, means for controlling the frequency of said oscillator by the output of said integrator means for adding the outputs of said pair of transducers to produce a sum signal, and means for indicating the amplitude of said sum signal.

7. An automatically tracking wave analyzer comprising, an oscillator, a modulator having impressed thereon the output of said oscillator and an input signal the amplitude of a frequency component of which is to be measured, a magnetostrictive rod tuned to a selected center frequency, a transducer for impressing said modulated output signal on said magnetostrictive rod to cause vibration thereof over a band of frequencies centered about said selected center frequency, a mechanical filter rod sharply tuned to a frequency within the pass band of said magnetostrictive rod and coupled thereto for excitation thereby, a pair of mechanical filter rods sharply tuned to narrow overlapping bands on either side of the band of said rod and coupled thereto for excitation thereby, a pair of magnetostrictive rods tuned respectively to the bands of said pair of mechanical filter rods and filamentarily coupled thereto for excitation thereby, a pair of transducers respectively coupled to each of said magnetostrictive rods for producing signals whose amplitudes are proportional to the amplitudes of vibration of said pair of magnetostrictive rods, means for subtracting said last-mentioned signals to produce a difference signal, an integrator having said difference signal impressed thereon, means for controlling the frequency of said oscillator by the output of said integrator to maintain the difference of said oscillator and input frequencies at the tuned frequency of said mechanical filter rod, and means for indicating the sum of the outputs of said pair of transducers, whereby said means for indicating indicates the amplitude of said frequency component of the input signal which is to be measured.

References Cited in the file of this patent

UNITED STATES PATENTS

| | | |
|---|---|---|
| 2,100,733 | Case | Nov. 30, 1937 |
| 2,147,509 | Wilkens | Feb. 14, 1939 |
| 2,631,193 | Roberts | Mar. 10, 1953 |